US010385235B2

(12) United States Patent
Eijkenboom

(10) Patent No.: US 10,385,235 B2
(45) Date of Patent: Aug. 20, 2019

(54) PROCESS FOR PREPARING A POLYMERIZED CASHEW NUT SHELL LIQUID AND ITS USE FOR THE PREPARATION OF A BITUMEN COMPOSITION

(71) Applicant: VENTRACO INNOVATION CENTRE AMSTERDAM B.V., Amsterdam (NL)

(72) Inventor: Antonius Caspar Johannes Eijkenboom, Heerhugowaard (NL)

(73) Assignee: VENTRACO INNOVATION CENTRE AMSTERDAM B.V., Amsterdam (NL)

(*) Notice: Subject to any disclaimer, the term of this patent is extended or adjusted under 35 U.S.C. 154(b) by 44 days.

(21) Appl. No.: 15/362,200

(22) Filed: Nov. 28, 2016

(65) Prior Publication Data
US 2017/0152384 A1  Jun. 1, 2017

(30) Foreign Application Priority Data

Nov. 26, 2015 (EP) ..................................... 15196489

(51) Int. Cl.
C09F 7/06 (2006.01)
C09F 5/04 (2006.01)
C08F 4/02 (2006.01)
C08F 4/32 (2006.01)
C08F 4/42 (2006.01)
C08G 16/02 (2006.01)
C08F 136/22 (2006.01)
C08L 95/00 (2006.01)
C08F 242/00 (2006.01)
C08L 91/00 (2006.01)

(52) U.S. Cl.
CPC ................. C09F 7/06 (2013.01); C08F 4/02 (2013.01); C08F 4/32 (2013.01); C08F 4/42 (2013.01); C08F 136/22 (2013.01); C08F 242/00 (2013.01); C08G 16/02 (2013.01); C08L 91/00 (2013.01); C08L 95/00 (2013.01); C09F 5/04 (2013.01); C08F 2800/20 (2013.01)

(58) Field of Classification Search
CPC ........... C09F 5/04; C09F 7/06; C10M 129/00; C10M 159/08; C10M 159/20; C10M 159/22; C11B 1/00; C11B 1/04; C11B 15/00; C11B 5/00; C11B 3/00; C11B 7/00; C11C 1/00; C11C 3/00; C08L 2207/00; C08L 2207/32; C08L 2207/322; C08L 2207/324; B01D 3/00; B01D 3/02; B01D 3/14; B01D 5/00; B01D 11/00; B01D 11/0296; C08F 4/02; C08F 4/32; C08F 4/43; C08F 2800/20; C08G 16/02
See application file for complete search history.

(56) References Cited

U.S. PATENT DOCUMENTS

| 1,912,435 | A | | 6/1933 | Damitz | |
|---|---|---|---|---|---|
| 2,143,880 | A | * | 1/1939 | Hughes | C08G 63/48 525/437 |
| 2,223,549 | A | | 12/1940 | Harvey | |
| 4,352,944 | A | * | 10/1982 | Tyman | C11B 3/12 568/750 |
| 2009/0281355 | A1 | * | 11/2009 | Sato | C07C 37/74 564/305 |

FOREIGN PATENT DOCUMENTS

| EP | 1642935 | 4/2006 |
|---|---|---|
| EP | 2389415 | 11/2011 |
| WO | 2010/077141 | 7/2010 |
| WO | WO 2010/085140 | 7/2010 |
| WO | 2010110651 | 9/2010 |

OTHER PUBLICATIONS

Bringel, et al. "Thermo-Rheological Behavior of Modified Bitumens Adding Virgin and Waste Polymers", http:///www.researchgate.net/publication/261063347, Conference Paper, May 2008.
Harvey, M.T. "A Brief Story of the Development of Cashew Nut Shell Liquid in the United States" 1966.
Rodrigues, et al. "Thermal Oligomerisation of Cardonal", e-Polymers, 2006, 081:1-14, http:///www.epolymers.org, ISSN 1618-7229.
Viswalingam, et al. "A Process for Selective Extraction of Cardanol from Cashew Nut Shell Liquid (CNSL) and its Useful applications" International Journal of Scientific & Engineering Research, 2013, 4(3):1-4.
Voirin, et al. "Functionalization of cardanol:towards biobased polymers and additives", Polym. Chem., 2014, 5:3142-3162.
M. T. Harvey, et al., Cashew Nut Shell Liquid, Industrial and Engineering Chemistry, vol. 32, No. 10, Oct. 1, 1940.
Abstract: E. A. Ribeiro, et al., Evaluation of Moisture Damage in Asphalt . . . ,5th Eurasphalt & Eurobitume Congress, Jun. 13-15, 2012, pp. 13-15.

(Continued)

Primary Examiner — Alexandra M Moore
(74) Attorney, Agent, or Firm — Nixon & Vanderhye P.C.

(57) ABSTRACT

The invention relates to a method for the preparation of a polymerized CNSL composition, the method comprising subjecting a raw or technical CNSL to a heat treatment under reflux to obtain the polymerized CNSL composition, wherein the heat treatment is performed until the polymerized CNSL composition has a molecular weight $M_w$ of about 2800 to about 3700, such as from about 2900 to about 3600, or from about 3000 to about 3500 g/mol. The invention further relates to a polymerized CNSL composition, use of a polymerized CNSL composition according to the invention in a bitumen composition, a modified bitumen composition according to the invention and an asphalt composition comprising a modified bitumen composition according to the present invention.

9 Claims, 4 Drawing Sheets

(56) References Cited

OTHER PUBLICATIONS

Rosy Antony, et al., GPC Studies on the Cationic Polymerization of Cardanol . . . , Journal of Applied Polymer Science, Jan. 1, 1990, pp. 1765-1775.

Selma Elaine Mazzetto, et al., Cashew Nut Oil: Opportunies and Challenges in the Context of Sustainable Industrial Development, Quimica Nova (2009) vol. 32, No. 3, p. 732-741.

Anonymous: Pitch (Resin)—Wikipedia the free encyclopedia. Apr. 26, 2016. Retrieved from URL:https://en.wikipedia.org/wiki/Pitch_(resin) Retrieved: Apr. 28, 2016.

Moreira, et al., Stablization of Asphaltenes by Phenolic Compounds Extracted . . . ,Journal of Applied Polymer Science, John Wiley & Sons, Inc. US (1999) vol. 73, No. 1, p. 29-34.

EP Search Report dated May 10, 2016.

Extended European Search Report dated Jul. 20, 2017, which issued during prosecution of European Application No. 16200894.0.

Kumar, et al. "Process for Isolation of Cardanol from Technical Cashew (*Anacardium occidentale* L.) Nut Sheel Liquid" Journal of Agricultural and Food Chemistry, 2002, 50:4705-4708.

Kuriakose, et al. "Bitumenous paints from refinery sludge" Surface and Coatings Technology, 2001, 145;132-138.

Lesueur. "The colloidal structure of bitumen: Consequences on the rheology and on the mechanisms of bitumen modification" Advances in Colloid and Interface Science, 2009, 145:42-82.

Loeber, et al. "Bitumen in colloid science: a chemical, structural and rheological approach" Fuel, 1998, 77(13):1443-1450.

Mahanwar, et al. "Effect of Cashew Nut Shell Liquid (CNSL) on Properties of Phenolic Resins" Journal of Applied Polymer Science, 1996, 61:2107-2111.

\* cited by examiner

PROCESS FOR PREPARING A
POLYMERIZED CASHEW NUT SHELL
LIQUID AND ITS USE FOR THE
PREPARATION OF A BITUMEN
COMPOSITION

RELATED APPLICATIONS AND
INCORPORATION BY REFERENCE

This application claims priority and benefit of European Application 15196489.7, entitled PROCESS FOR PREPARING A POLYMERIZED CASHEW NUT SHELL LIQUID AND ITS USE FOR THE PREPARATION OF A BITUMEN COMPOSITION filed on Nov. 26, 2015.

All documents cited or referenced herein ("herein cited documents"), and all documents cited or referenced in herein cited documents, together with any manufacturer's instructions, descriptions, product specifications, and product sheets for any products mentioned herein or in any document incorporated herein by reference, are hereby incorporated herein by reference, and may be employed in the practice of the invention.

FIELD OF THE INVENTION

The present invention relates to a method for the preparation of a polymerized cashew nut shell liquid (CNSL) composition, a polymerized CNSL composition, use of the polymerized CNSL according to the invention in a bitumen composition, a modified bitumen composition comprising the polymerized CNSL composition according to the invention and an asphalt composition comprising the modified bitumen according to the invention.

BACKGROUND OF THE INVENTION

Bitumen is a bi-product of the distillation of oil, which is widely used in the preparation of asphalts. Bitumen comprises saturated hydrocarbons, aromates, resins and asphaltenes. Asphaltenes are high molecular weight hydrocarbons, the composition of which vary depending on the oil distillation process. The aromates and resins stabilize the asphaltenes by keeping them dispersed in the bitumen.

Current bitumen production differs from the original "straight run" bitumen. The straight run bitumen is a residue of a distilled crude oil. In the past, it was often produced with only one type of crude oil. The last decades the refineries has changed over to other production techniques such as hydrocracking and crude blending. Because of this, the virgin bitumen does not meet the requirements of the asphalt producers road builders.

More and more bitumen are sold on the market with a high asphaltenes content and low aromatics and resins content (the maltenes). If polymers or waxes are introduced to this type of binder the colloidal stability is disrupted and the bitumen will lose a big part of its properties. When the bitumen becomes unstable the asphalt mix will lose its workability and its cohesion. Furthermore, a significant decrease is observed in the water sensitivity. Adding maltenes will improve the bitumen binder behaviour and will stabilize the asphaltenes. Adding aged asphalt to the asphalt mix with this high asphaltenes content, will have the same result as the addition of polymers or waxes: not only will it make the virgin unstable it will also result in a quicker aging. Accordingly, there is a need methods for modifying virgin bitumen compositions.

Furthermore, bitumen compositions are very sensitive to aging and need to be replaced in time as their properties degrade in the course of time. A common problem is that bitumen compositions become too brittle as a result of which road surfaces deteriorate and need to be renewed every so many years. Since the amount of available and suitable bitumen has been decreasing considerably in recent years, it is also desirable to reuse bitumen compositions. This can be established by recycling the bitumen compositions with or without the addition of fresh bitumen and/or suitable additives.

Examples of known additives to modify bitumen compositions for recycling include for instance mineral oils, paraffin's and rapeseed oil. These additives have, however, the disadvantage that they render the bitumen composition too soft, resulting in for instance asphalts having too high viscous behavior and thus impacting the durability of such asphalts in road applications. Another disadvantage of these additives is that they poorly agree with bitumen compositions as they not only have a bad influence on the colloidal index (CII), but also on the adhesion on the minerals. Other known bitumen modification additives include petrochemical resins but these are very expensive.

An alternative and less costly additive to rejuvenate (recycle) bitumen compositions has been proposed in WO 2010/085140, which describes a method to rejuvenate bitumen-containing compositions by adding to the bitumen-containing compositions a distillation residue of a cashew nut shell liquid (DR-CNSL). Further, WO 2010/110651 discloses another method for rejuvenating a bitumen-containing according to which a raw (untreated) cashew nut shell liquid, which has been heated so as to obtain a technical CNSL (T-CNSL), is added to a bitumen-containing composition. The rejuvenated bitumen-containing compositions obtained in accordance with these two patent specifications, still leave considerable room for improvement.

The present inventors hereby provide an improvement to these previously disclosed methods, by providing a polymerized CNSL, that besides showing an improved effect, also is more reliable and obtainable with a high yield.

SUMMARY OF THE INVENTION

In one embodiment, the present invention provides a method for the preparation of a polymerized CNSL composition, the method comprising subjecting a raw or technical CNSL to a heat treatment under reflux to obtain the polymerized CNSL composition, wherein the heat treatment is performed until the polymerized CNSL composition has a molecular weight $M_w$ of about 2800 to about 3700, such as from about 2900 to about 3600, or from about 3000 to about 3500 g/mol. This method results in a polymerized CNSL with a reliable composition in a high yield, which composition has improved effect when used for modifying bitumen compositions, such as compositions comprising virgin, natural bitumen and/or aged bitumen.

Accordingly, in another embodiment, the present invention relates to a polymerized CNSL composition obtainable by this method, which has improved effect when used in modifying bitumen compositions, such as compositions comprising virgin bitumen and/or recycled bitumen.

In another embodiment, the present invention relates to polymerized CNSL composition having a molecular weight of about 2800 to about 3700, such as from about 2900 to about 3600, or from about 3000 to about 3500 g/mol, which has improved effect when used for modifying bitumen compositions, such as compositions comprising virgin bitumen and/or recycled bitumen.

In yet another embodiment, the present invention relates to use of the polymerized CNSL composition according to the invention or obtainable by the method for the preparation of a polymerized CNSL according to the invention, in a bitumen composition. Use of such polymerized CNSL compositions according to the invention in bitumen results in a modified bitumen composition, for example by decreasing the colloidal index, decreasing the penetration index, decreasing the stiffness, increasing the fatigue, increasing the phase angle and/or increasing the water sensitivity of the bitumen composition.

In a further embodiment, the present invention relates to bitumen compositions comprising from about 0.2 to about 40 wt. % polymerized CNSL, such as, from about 0.5 to about 35 wt. %, from about 2 to about 30 wt. %, from about 5 to about 25 wt. % or from about 5 to about 20 wt. % of the polymerized CNSL composition according to the invention or obtainable by the method for the preparation of a polymerized CNSL according to the invention. The bitumen compositions prepared in accordance with the present invention display an improved performance in terms of penetration index (I), colloidal index (CII), stiffness, fatigue, phase angle and/or water sensitivity when compared with known bitumen-containing compositions that have been modified with distillate residues of cashew nut shell liquids (DR-CNSLs), technical cashew nut shell liquids (T-CNSLs) or raw cashew nut shell liquids (R-CNSLs).

A further embodiment of the present invention relates to asphalt compositions comprising a bitumen composition according to the present invention.

DETAILED DESCRIPTION OF THE INVENTION

Method for Preparing a Polymerized CNSL Composition

In one embodiment, the present invention relates to a method for the preparation of a polymerized CNSL composition, the method comprising subjecting a raw or technical CNSL to a heat treatment under reflux to obtain the polymerized CNSL composition, wherein the heat treatment is performed until the polymerized CNSL composition has a molecular weight $M_w$ of about 2800 to about 3700, such as from about 2900 to about 3600, or from about 3000 to about 3500 g/mol.

The preparation method according to the invention results in a polymerized CNSL with a reliable composition and a high yield, when compared to the known DR-CNSL, which is also a polymerized CNSL. Furthermore, the polymerized CNSL according to the invention, hereinafter also called "directly polymerized CNSL" or "DP-CNSL", has improved effect when used for modifying bitumen compositions, such as compositions comprising virgin bitumen and/or recycled bitumen, when compared to the effect of DR-CNSL, T-CNSL and R-CNSL.

Figure 1A:
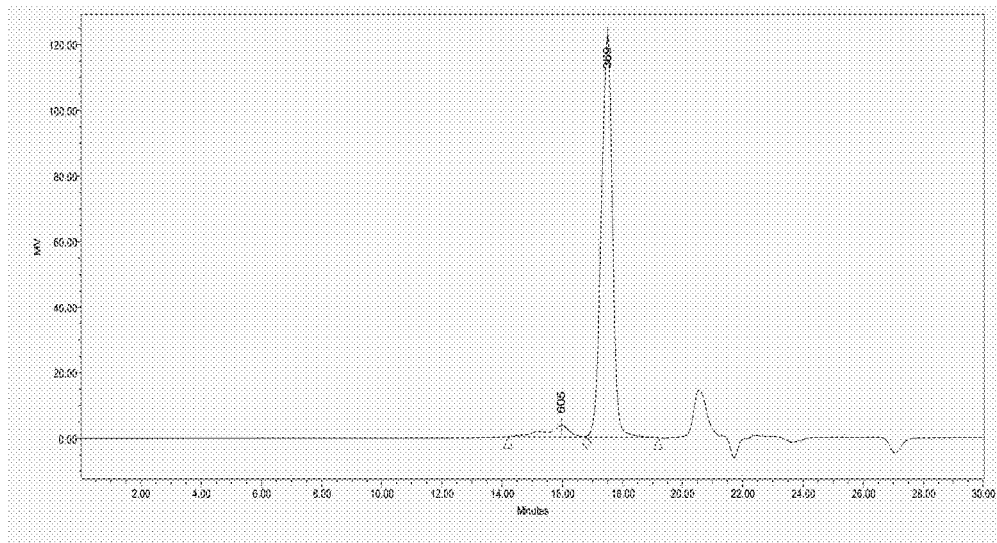
FIGS. 1A and 1B show GPC chromatograms of two different samples of a T-CNSL, where FIG. 1A corresponds to sample no. 3 in table 1, and FIG. 1B corresponds to sample no. 4 in table 1.
Figure 1B:
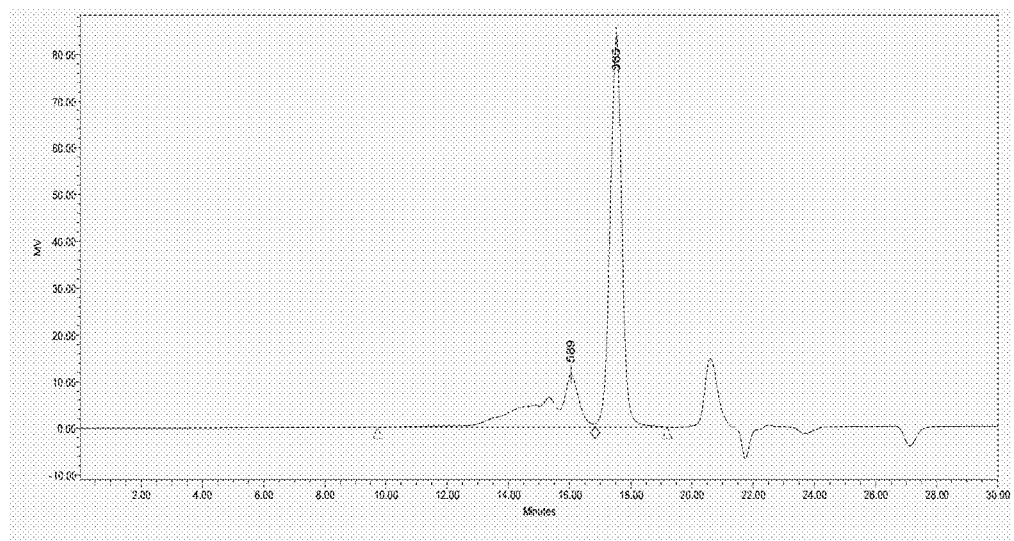

The starting material used in the method according to the present invention, can be either R-CNSL or T-CNSL. As used herein, the term "raw CNSL" or "R-CNSL" means CNSL obtained by solvent extraction and is characterized by comprising mostly anacardic acid. The exact composition of R-CNSL varies with the exact conditions under which the extraction is performed, but the composition is roughly 70 wt. % anacardic acid, 18 wt. % cardol and 5 wt. % cardanol. The term "raw CNSL" is used interchangeably with the term "natural CNSL", "crude CNSL" or "untreated CNSL". As used herein, the term "technical CNSL" or "T-CNSL" means the CNSL obtained by hot-oil or roasting processing of the cashew nuts. Technical CNSL is rich in cardanol. The exact composition of technical CNSL varies with the exact conditions under which the roasting is performed, as can be seen from samples 3 and 4 shown in Table 1 and in FIGS. 1A and 1B.

The heat treatment may suitably be carried out at a temperature in the range of from about 150° C. to about 400° C., such as, from about 225° C. to about 375° C., from about 250° C. to about 350° C. or from about 250° C. to about 300° C. for about 1 to about 10 hours, such as from about 2 to about 9 hours, from about 3 to about 8 hours, from about 4 to about 7 hours or from about 5 to about 6 hours. In one embodiment, the heat treatment is carried out at a temperature from about 250° C. to about 300° C. for about from about 5 to about 6 hours. Furthermore, the heat treatment may suitable be carried out at atmospheric pressure, but may also be carried out at higher pressure, such as from 1000-10,000 hPa. The heat treatment is performed under reflux and thereby leading to a high yield in terms of retaining compounds present in the starting material or polymerization products thereof. As opposed hereto, the known polymerization product of CNSL, DR-CNSL has a lower yield due to fact that the anacardic, cardol and cardanol present in the starting material CNSL are distilled off, instead of, as in the present invention, being retained in the composition and undergoing polymerization therein.

Figure 2A:
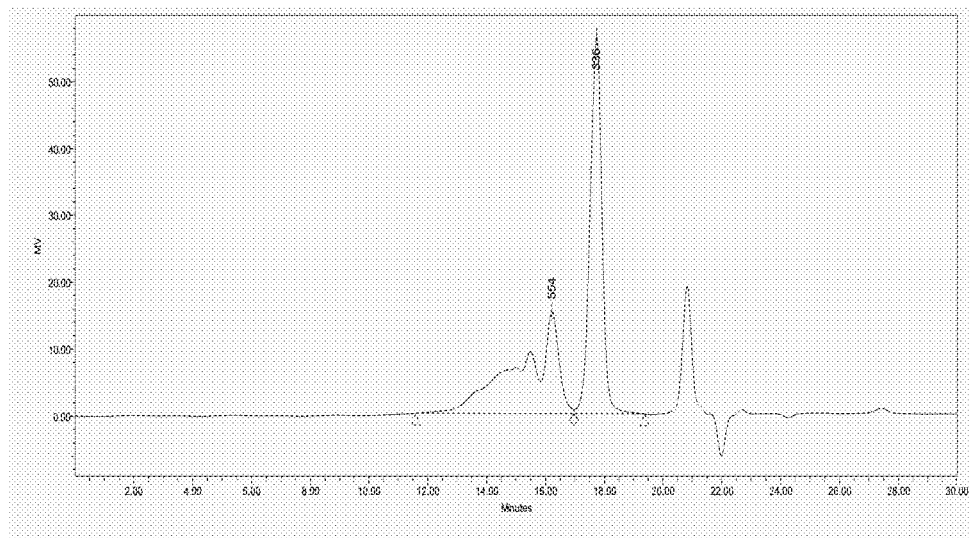
FIGS. 2A and 2B show GPC chromatograms of two different samples of DR-CNSL (code NX-5345) produced in China and USA, respectively), wherein FIG. 2A corresponds to sample no. 1 in table 1 and FIG. 2B corresponds to sample no. 2 in table 1.
Figure 2B:
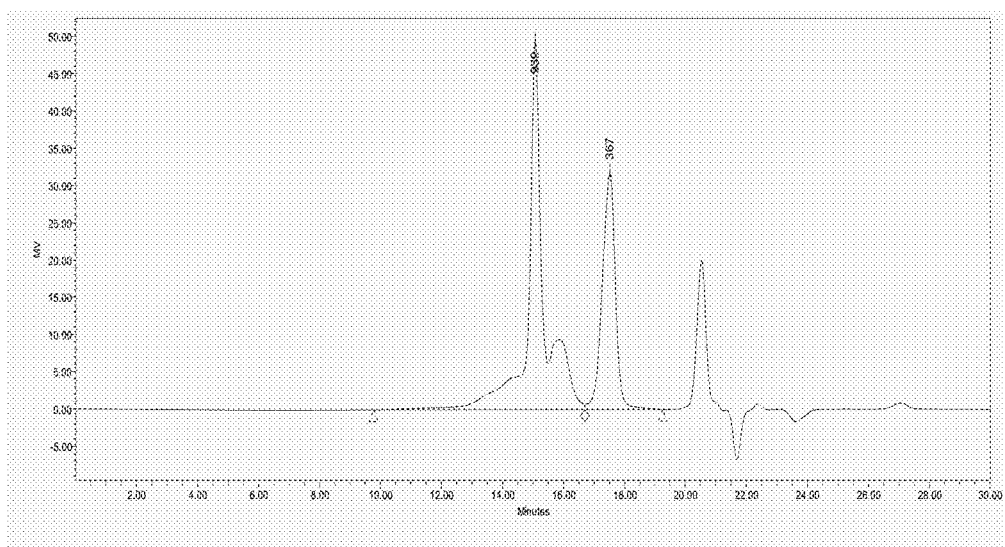
Figure 3A:
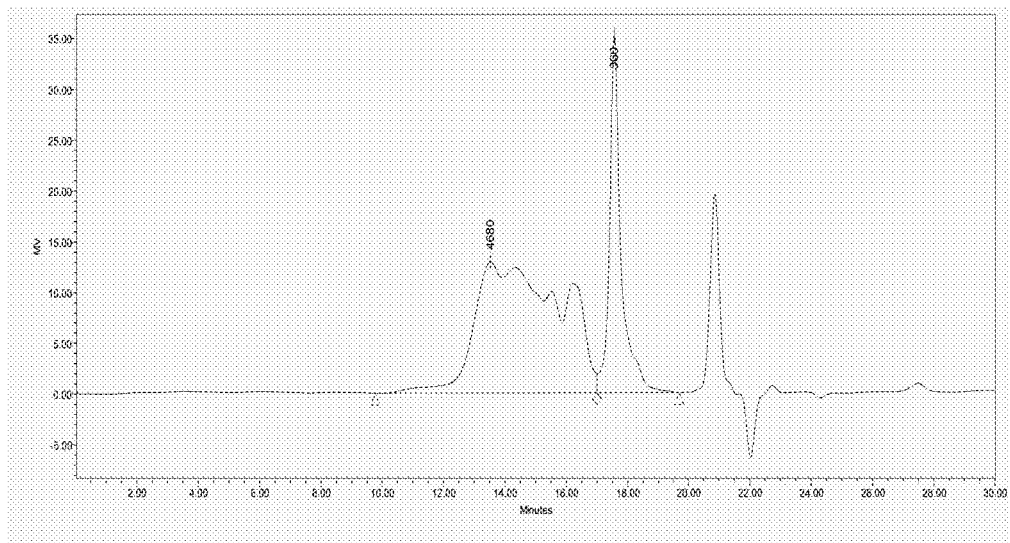
FIGS. 3A and 3B show GPC chromatograms of two different samples which have been polymerized according to method of the present invention, wherein FIG. 3A corresponds to sample no. 5 in table 1 and FIG. 3B corresponds to sample no. 6 in table 1.
Figure 3B:
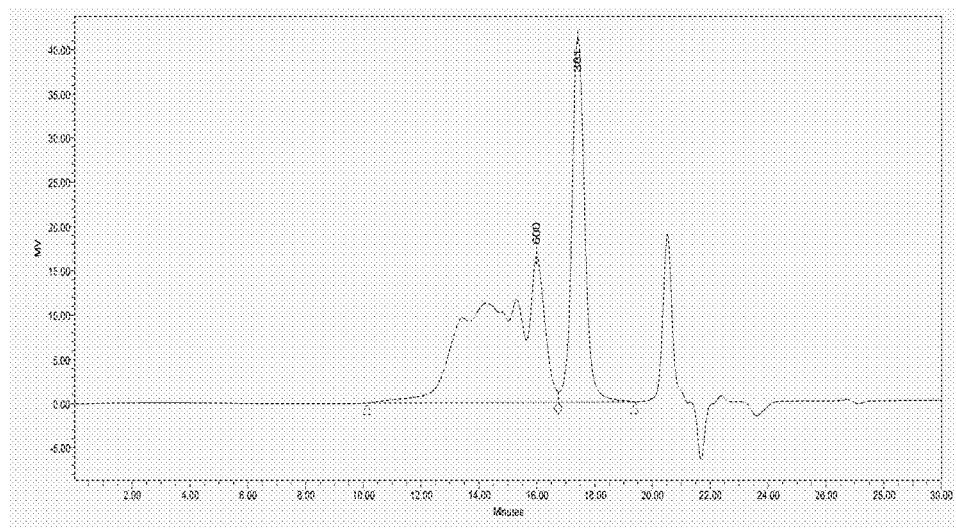
Figure 4:
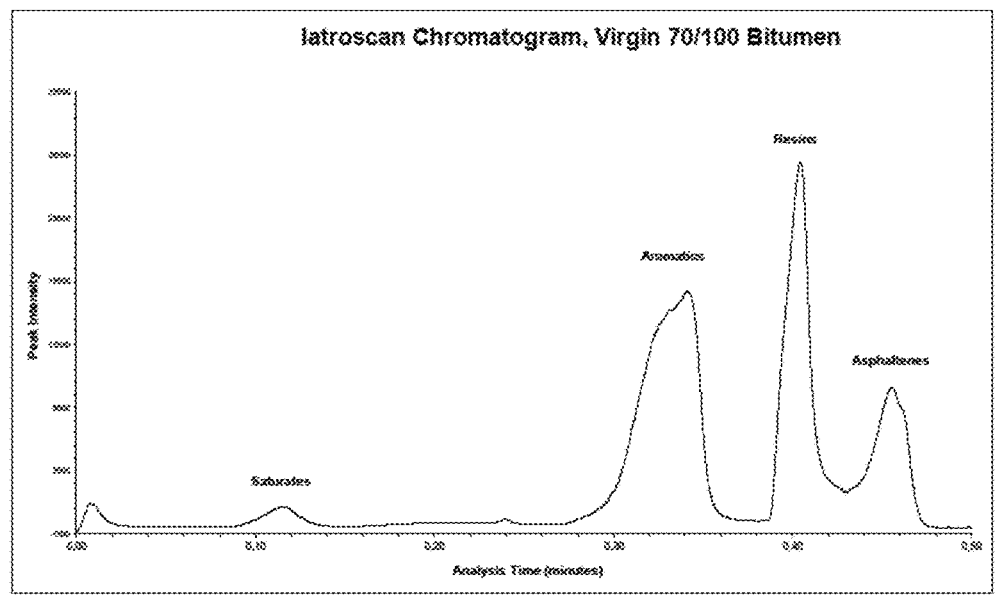
FIG. 4 shows a Iatrogram chromatogram of virgin 70/100 bitumen.

As used herein, the term "polymerized CNSL" is a composition based on polymerization of R-CNSL or T-CNSL. A polymerized CNSL comprises a polymerized fraction and an un-polymerized fraction, where the polymerized fraction comprises alkyl-phenol polymers, which are high molecular weight polymerization products of cardol and cardanol. The polymerized fraction corresponds to the first peak in the GPC chromatograms of DR-CNSL and DP-CNSL shown in FIGS. 2 and 3, respectively. The un-polymerized fraction comprises mainly cardanol and corresponds to the second peak in these chromatograms.

As used herein, the term "distillation residue of CNSL" or "DR-CNSL" means the distillation residue obtained upon distilling T-CNSL in order to obtain purified cardanol. The distillation residue of CNSL comprises high molecular weight polymerization products of cardol and cardanol and the already polymerized alkyl phenols present in the technical CNSL. Since the majority of the cardol and cardanol is distilled off, the distillation residue of CNSL mainly comprises the products of further polymerization of the polymerized fraction of the CNSL. This distillation residue is a liquid which can be made into a solid powder which is widely used as a component in friction materials. The exact composition of DR-CNSL also varies among batches, and even more so than T-CNSL, depending both on the composition on the starting material CNSL and on the exact conditions under the distillation is performed as can be seen samples 1 and 2 in Table 1 and in FIGS. 2A and 2B.

As used herein, "directly polymerized CNSL" means the polymerized CNSL according to the present invention. It is also called DP-CNSL or "RheoFalt HP-AM". For the avoidance of any doubt, DP-CNSL is not the result of a distillation process and thereby differs from DR-CNSL. Since DP-CNSL is not the same as DR-CNSL, the polymerized CNSL according to the invention is not a distillation residue CNSL.

As used herein, the term "polymerized fraction" of a CNSL composition means the fraction comprising the polymerized alkyl phenols. The polymerized fraction comes out as peak 1 in a gel permeation chromatography (GPC) as illustrated for DP-CNSLs according to the invention in FIG. 3. The amount of this fraction by wt. % varies considerably among different types and batches of known CNSL compositions. Furthermore, the $M_w$ and $M_n$ of the polymers present in this fraction also varies considerably between different types and batches of known CNSL compositions. This variation is highly undesirable for using CNSL as a modifying additive for bitumen. Here, reliability and reproduction of the effect is of course of outmost importance. This problem is solved by the present invention.

As used herein, the "un-polymerized fraction" of a CNSL fraction means the fraction mainly comprising alkyl phenols selected from the group consisting of anacardic acid, cardol and cardanol and has an $M_w$ in the area of 350-370 g/mol. The un-polymerized fraction comes out as peak 2 in a gel permeation chromatography (GPC) as illustrated for DP-CNSLs according to the invention in FIG. 3.

As used herein, "Molecular weight" ($M_w$) means the mass average molar mass and is calculated by formula 1:

$$\overline{M}w = \frac{N_i M_i^2}{N_i M_i}$$

where $N_i$ is the number of molecules of molecular Mass $M_i$. Accordingly, in the context of the present application $M_w$ is a weighted average of the $M_w$ of the polymers present in the composition or the fraction in question according to formula 1 and is also commonly referred to as weight average or weight average molecular weight.

In one embodiment of the present invention, the heat treatment is performed until the polymerized CNSL composition furthermore has a number average molar mass $M_n$ of from about 600 to about 800, from about 620 to about 750, from about 635 to about 720 or from about 650 to about 700 g/mol. As used herein, "number average molar mass" ($M_n$) is the ordinary average of the molecular masses of the individual macromolecules. It is determined by measuring the molecular mass of n polymer molecules, summing the masses, and dividing by n. $M_n$ is calculated by formula 2:

$$\overline{M}n = \frac{\Sigma_i N_i M_i}{\Sigma_i N_i}$$

Preferably, the heat treatment is performed until the obtained polymerized CNSL composition furthermore has a ratio of $M_w$:Mn of from about 3.5 to about 5.5, such as from about 4 to about 5, from about 4.5 to about 5 or from about 4.7 to about 4.9, where $M_w$:Mn is a measure of the dispersity, formerly known as polydispersity index (PDI) which is used to describe the degree of "non-uniformity" of a distribution. The heat treatment may also be performed until the obtained polymerized CNSL composition further has a water content of less than 0.2 wt. % based on the total polymerized CNSL composition.

Furthermore, the heat treatment may be performed until the polymerized fraction of the polymerized CNSL composition has a $M_w$ of from about 3800 to about 4800, such as from about 4000 to about 4750, from about 4200 to about 4700, from about 4400 to about 4650 or from about 4500 to about 4600 g/mol and/or a Mn of from about 950 to about 1300, such as from about 1000 to about 1250, from about 1050 to about 1200 or from about 1100 to about 1150 g/mol. The heat treatment may also be performed until the polymerized fraction constitutes more than 50 wt. % of the polymerized CNSL composition. Preferably, the heat treatment is performed until the polymerized fraction of the polymerized CNSL composition has a ratio of $M_w$:Mn of from about 2.5 to about 5.5, such as from about 3 to about 5, from about 3.5 to about 4.5, or about 4.

In a preferred embodiment, the heat treatment is performed until the obtained polymerized CNSL composition has a $M_w$ from about 3000 to about 3500 g/mol, a Mn from about 650 to about 700 g/mol, a ratio of $M_w$:Mn of from about 4.7 to about 4.9 and/or until the polymerized fraction of the obtained polymerized CNSL has a $M_w$ of from about 4500 to about 4600 g/mol, a Mn of about 1100 to about 1150 g/mol and a ratio of $M_w$:Mn of about 4.

In another preferred embodiment, the heat treatment is performed until the obtained polymerized CNSL according to the invention has a viscosity of at least 25,000 mPa·s at 25° C., such as at least 28,000 mPa·s at 25° C., at least 30,000 mPa·s at 25° C., at least 35,000 mPa·s at 25° C., at least 40,000 mPa·s at 25° C., at least 45,000 mPa·s at 25° C., at least 50,000 mPa·s at 25° C., at least 55,000 mPa·s at 25° C., at least 60,000 mPa·s at 25° C., at least 65,000 mPa·s at 25° C. or at least 68,000 mPa·s at 25° C.

The heat treatment to be carried out in accordance with the present invention can suitably be carried out in the presence of a catalyst. Suitable catalysts to be used include metal catalysts that can be supported on a carrier material such as silica, alumina or titanium; or they can be unsupported metal catalysts. Suitable metals to be used in supported or non-supported metal catalysts can be selected from the group consisting of nickel, zinc, cobalt, lead, cupper and palladium. Other suitable catalysts are pumice and silica. Such catalyst can suitably be present in an amount in the range of from 1.0-10.0 wt. %, based on total weight of the cashew nut shell liquid.

The heat treatment may also take place in the presence of organic substances such as aldehydes (e.g. formaldehyde and 1,3,5-trioxaan.) or hexamethylenetetramine. The reaction product obtained will be a phenolic resin with aromatic groups and also aliphatic chains. Such organic substances can suitably be present in an amount in the range of from 1.0-25.0 wt. %, based on total weight of the cashew nut shell liquid.

The method for the preparation of a polymerized CNSL according to the present invention results in a polymerized CNSL with a reliable composition in a high yield, which composition has improved effect when used for modifying bitumen compositions, such as compositions comprising virgin bitumen and/or recycled bitumen. The skilled person will understand that temperature, time and pressure under which the process of the present invention is performed, may be adjusted so as to obtain a product with one or more of the given characteristics in terms of $M_w$, $M_n$ and the ratio of $M_w:M_n$ for the polymerized CNSL obtained by the method, and will vary depending on the composition of the R-CNSL or T-CNSL used as starting material. What is important is to adjust the temperature, time and pressure so as to obtain a product with one or more of the above-mentioned characteristics.

Polymerized CNSL Composition According to the Invention

The present invention also relates to a polymerized CNSL composition obtainable by the above described method for the preparation of a polymerized CNSL composition according to the present invention. Such polymerized CNSL composition according to the invention can be used for modifying bitumen compositions, such as compositions comprising virgin bitumen and/or recycled bitumen. Furthermore, the present inventors have found, that it has an improved effect in modifying bitumen compositions compared to the effect of DR-CNSL, T-CNSL and R-CNSL.

In another embodiment, the present invention relates to a polymerized CNSL composition having a molecular weight $M_w$ of about 2800 to about 3700, such as from about 2900 to about 3600, or from about 3000 to about 3500 g/mol and/or a number average molar mass $M_n$ of from about 600 to about 800, from about 620 to about 750, from about 635 to about 720 or from about 650 to about 700 g/mol. Preferably the polymerized CNSL composition according to the invention further has a water content of less than 0.2 wt. % based on the total polymerized CNSL composition. Even more preferred, the polymerized CNSL composition according to the invention further has a ratio of $M_w:M_n$ of from about 3.5 to about 5.5, such as from about 4 to about 5, from about 4.5 to about 5 or from about 4.7 to about 4.9.

The polymerized fraction of the polymerized CNSL according to the invention comprises alkyl-phenol polymers having a molecular weight in the range of from 500-25,000, such as in the range of from 600-10,000 or 700-10,000 g/mol and/or a number average molecular weight ($M_n$) in the range from 400-2500, such as in the range of from 450-2000 or 450-1500 g/mol. The ratio $M_w:M_n$ of the alkyl-phenol polymers in this fraction lies in the range of from 1.3-10.0, preferably in the range of from 1.3-5.0, and more preferably in the range of from 1.6-6.7.

Preferably, the polymerized fraction of the polymerized CNSL composition according to the invention has a $M_w$ of from about 3800 to about 4800, such as from about 4000 to about 4750, from about 4200 to about 4700, from about 4400 to about 4650 or from about 4500 to about 4600 g/mol and/or a $M_n$ of from about 950 to about 1300, such as from about 1000 to about 1250, from about 1050 to about 1200 or from about 1100 to about 1150 g/mol. Preferably, the polymerized fraction constitutes more than 50 wt. % of the polymerized CNSL composition. It is also preferred that the polymerized fraction of the polymerized CNSL according to the invention has a ratio of $M_w:M_n$ of from about 2.5 to about 5.5, such as from about 3 to about 5, from about 3.5 to about 4.5, or about 4. In a preferred embodiment, the polymerized fraction of the polymerized CNSL according to the invention has a $M_w$ from about 3000 to about 3500 g/mol, a $M_n$ from about 650 to about 700 g/mol, a ratio of $M_w:M_n$ of from about 4.7 to about 4.9. In an even more preferred embodiment, the polymerized fraction of the polymerized CNSL according to the invention has a $M_w$ of from about 4500 to about 4600 g/mol, an $M_n$ of about 1100 to about 1150 g/mol and a ratio of $M_w:M_n$ of about 4. The alkyl-phenol polymers (also called the polymerized fraction) having a molecular weight ($M_w$) in the range of from 500-25,000 can suitably be present in an amount in the range of from 40-80 wt. %, based on the total weight of the polymerized CNSL according to the invention. Preferably, the alkyl-phenol polymers are present in an amount in the range of from 50-90 wt. %, more preferably in the range of from 60-95 wt. %, based on the total weight of the polymerized CNSL according to the invention. During the heating performed in the method for the preparation of the polymerized CNSL according to the invention, most of the cardanol present in the starting material T-CNSL or derived from the anacardic acid that is originally present in the starting material R-CNSL, is polymerized. Accordingly, the cardanol content in the polymerized CNSL according to the invention is lower than in the known CNSLs, including the DR-CNSL, which is an advantage because of cardanol being an irritating compound for people handling it. The cardanol content in DP-CNSL is typically lower that 40 wt. %, such as lower than 35 wt. %, lower than 30 wt. %, lower than 25 wt. %, lower than 20 wt. %, lower than 15 wt. %, lower than 10 wt. % or lower than 5 wt. %.

Preferably, the polymerized CNSL according to the invention has a viscosity of at least 25,000 mPa·s at 25° C., such as at least 28,000 mPa·s at 25° C., at least 30,000 mPa·s at 25° C., at least 35,000 mPa·s at 25° C., at least 40,000 mPa·s at 25° C., at least 45,000 mPa·s at 25° C., at least 50,000 mPa·s at 25° C., at least 55,000 mPa·s at 25° C., at least 60,000 mPa·s at 25° C., at least 65,000 mPa·s at 25° C. or at least 68,000 mPa·s at 25° C.

The polymerized CNSL composition according to the invention is useful for modifying and/or for stabilizing bitumen compositions, such as compositions comprising virgin bitumen, natural bitumen and/or recycled bitumen. Furthermore, the present inventors have found, that it has an improved effect in doing so compared to the effect of DR-CNSL, T-CNSL and R-CNSL. The polymerized CNSL according to the present invention has the advantage that it has a beneficial impact on important properties of a bitumen composition like for example improving the bitumen composition with respect to stiffness, fatigue, water sensitivity, phase angle, penetration index and/or colloidal index. This is most likely due to the alkyl-phenol polymers present in the polymerized fraction. Consequently, the bitumen compositions modified in accordance with the present invention will display a more rigid and elastic behavior and will age less rapidly.

Use of Polymerized CNSL According to the Invention in Bitumen Compositions

As used herein, the term "bitumen" is a virtually non-volatile, adhesive and waterproofing material obtained by refinery processes from crude petroleum (virgin bitumen), or present in natural asphalt deposits in some parts of the world (natural bitumen). It is black or brown in color and completely or nearly completely soluble in toluene. It is very viscous or near solid at ambient temperatures and softens gradually when heated.

As used herein, the term "blown bitumen" or "oxidized bitumen" means bitumen that has been treated by blowing air through it at elevated temperature to produce physical properties required for industrial use of the final product, such as higher softening point and great resistance to flow than a straight run bitumen of the same hardness.

As used herein the term "bitumen composition" means a composition comprising bitumen, such as a bitumen emulsion or bituminous binder, where a bituminous binder is a modified bitumen, or mixture of bitumen with fluxes, etc used for road sealing or the manufacture of asphalt mixes.

In one embodiment, the present invention relates to use of the polymerized CNSL composition according to the invention or obtainable by the method for the preparation of a polymerized CNSL according to the invention, in bitumen composition. Use of such polymerized CNSL compositions according to the invention in bitumen results in modifying the bitumen composition, where the term "modifying a bitumen composition" means changing one or more of the parameters selected from the group consisting of colloidal index (CII), penetration index (PI), stiffness, fatigue, phase angle and water sensitivity. These parameters are all important for the usefulness of a bitumen for different applications. The bitumen to be modified can be selected from the group consisting of virgin bitumen, natural bitumen, blown bitumen and aged bitumen, where aged bitumen is a bitumen composition in need of rejuvenation. As used herein, rejuvenation of bitumen is used interchangeably with recycling of bitumen.

In another embodiment, the present invention relates to use of the polymerized CNSL composition according to the invention for modifying and/or stabilizing a bitumen composition, where stabilizing the bitumen means stabilizing the asphaltenes by keeping them dispersed in the bitumen. Accordingly, the polymerized CNSL composition according to the invention can be used for decreasing the colloidal index, decreasing the penetration index, decreasing the stiffness, increasing the fatigue, increasing the phase angle and/or increasing the water sensitivity of a Bitumen composition.

The present invention also relates to a process for modifying a bitumen composition which comprising mixing a bitumen composition with a polymerized CNSL according to the invention to form a modified bitumen composition.

The Penetration Index (PI) is defined and determined by the penetration/ring and ball softening point method in accordance with formula 3:

$$PI\left(\frac{Pen}{R\&B}\right) = \frac{20T + 500 \log Pen - 1952}{T - 50 \log Pen + 120}$$

where Pen is defined as needle penetration at 25° as described in EN 1426, and R&B is defined as Ring and Ball softening point as described in EN 1427. Penetration Index (PI) is an index that tells something on the temperature sensitivity of bitumen at low temperatures. PI≤−2 will result in a very stiff and brittle bitumen at low temperatures, normally the PI is between +1.0 and −1.2. A PI of >2 is not used in the road building industry.

The bitumen composition modified in accordance with the present invention can suitably have a colloidal index (CII) in the range of from 0.0-9.0. Preferably, the bitumen composition modified in accordance with the present invention has a colloidal index in the range of from 0.1-0.7, and more preferably a colloidal index in the range of from 0.1-0.5, such as from 0.2 to 0.4. In the context of the present patent application the colloidal index (CII) is defined according to formula 4:

$$CII = \frac{\text{Weight saturates} + \text{Weight asphaltenes}}{\text{Weight resins} + \text{Weight aromatics}}$$

The saturates consists of nonpolar material including linear, branched, and cyclic saturated hydrocarbons (paraffins). The aromatics, which contain one or more aromatic rings, are slightly more polarizable. The remaining two fractions, resins and asphaltenes, have polar substituents. The distinction between the two is, that asphaltenes are insoluble in an excess of heptane (or pentane) whereas resins are miscible with heptane (or pentane).

In virgin bitumen the CII≤0.2. Aged bitumen compositions and bitumen compositions with a high content of asphaltenes have in general a CII of ≥0.4. At CII levels of ≥0.9 the asphaltenes will precipitate spontaneously.

In the context of the present application, "water sensitivity" (also called "Indirect Tensile Strength Retained" (ITSR), is determined according to NEN-EN12697-12. Both virgin straight run bitumen and blown bitumen will show an adhesion decrease on the minerals (stone fraction of the asphalt mix) when the asphaltenes are not stabilized properly. Because of this the asphaltenes can agglomerate and distort the flow characteristics of the asphalt mix. In most of these "unstable" bitumen the asphaltene content is high, i.e. higher than 15 wt. % or even higher than 25 wt. %. Having a high asphaltene content the resins fraction in these "unstable" bitumen compositions are often lower than the normal approximately 20 wt. %. The resins available in the asphalt mix are mainly captured by the asphaltenes which makes them less available for the adhesive properties of the bitumen. If the adhesion is decreasing, the water sensitivity increases. For normal mixes the ITSR will be 90% to 100%, below the 60% the asphalt mix will show a strong decline in the durability of the mix. In 2016 virgin straight run bitumen were observed with a water sensitivity (ITSR) of less than 45%.

In the context of the present application, "stiffness" is determined with the so called four point (beam) bending test in accordance with NEN-EN12697-26. Stiffness of the dynamic four point bending test is an indication how high the average load (MPa) can be without failing. When the asphaltenes are not stabilized correctly the asphalt will behave rigid and brittle. If bitumen have a high saturates content the stiffness will be low and the asphalt mix will be vulnerable to rotting. Blown bitumen compositions have a higher content of asphaltenes, which make them more brittle to start with. The softening point (R&B) is much higher than standard penetration bitumen which makes it more ideal for roofing applications. Stiffness levels will vary for the various asphalt application from min. 3500 MPa to max. 14,000 MPa. The stiffness in the four point bending test is measured at 20° C. with a load frequency of 8 Hz. I In the context of the present application, "fatigue" is determined according to the four point bending test NEN-EN12697-24. The fatigue properties of the asphalt is specified according the four point bending test. This test is run at a temperature of 20° C. and a frequency of 30 Hz. For a normal dense asphalt the fatigue should be ≥100 μm/m.

The phase angle in a measurement is an indication of the ability to withstand a certain load without failing and to recover after the load is ended ("flexibility"). The phase angle is determined in accordance with NEN-EN 12697-26 at 20° C., mean stiffness and at 8 Hz. With normal bitumen this angle is around the 20° to 25°. Stiff and brittle asphalt will show an angle of around the 10° to 6°. Below this value the durability of the asphalt mix will be poor.

Modified Bitumen Compositions Comprising CNSL According to the Present Invention In accordance with the present invention a modified bitumen composition is provided. Surprisingly, it appeared that by the addition of a relatively small amount of polymerized CNSL according to the invention, the modified bitumen composition has improved properties on one or more of the parameters selected from the group consisting of colloidal index (CII), penetration index (PI), stiffness, fatigue, phase angle and water sensitivity (ITSR), when compared with freshly prepared bitumen compositions and/or bitumen compositions which has been modified with the known T-CNSL, R-CNSL or DR-CNSL.

The bitumen composition to be modified in accordance with the present invention can be a bitumen composition derived from a variety of sources, such as virgin bitumen, natural bitumen and different kinds of aged bitumen compositions in need of rejuvenation. For example, the bitumen composition to be modified is selected from the group consisting of virgin bitumen, natural bitumen, blown bitumen compositions, polymer-containing bitumen compositions, metallocene-containing bitumen compositions and synthetic wax-containing bitumen compositions. The polymer-containing bitumen compositions may be bitumen compositions that have been modified with polymers such as styrene-butadiene-styrene (SBS) or ethylene vinyl acetate (EVA).

The bitumen composition to be modified in accordance with the present invention suitably contains asphaltenes in an amount in the range of from 2-25 wt. %, based on the total bitumen composition. Preferably, the bitumen composition to be modified in accordance with the present invention suitably contains asphaltenes in an amount in the range of from 10-20 wt. %, more preferably in the range of from 12-18 wt. %, based on the total bitumen composition.

In one embodiment, such bitumen composition comprises from about 0.2 to about 40 wt. % polymerized CNSL according to the invention, such as, from about 0.5 to about 35 wt. %, from about 2 to about 30 wt. %, from about 5 to about 25 wt. % or from about 5 to about 20 wt. % based on total weight of the modified bitumen composition.

Furthermore, the bitumen composition may comprise more than 50 wt. % bitumen, such as more than 55 wt. %, 60 wt. %, 65 wt. %, 75 wt. %, 80 wt. %, 85 wt. %, 90 wt. % or 95 wt. %. The bitumen composition may consist essentially of bitumen and polymerized CNSL according to the invention. If the bitumen in the composition is virgin bitumen, the bitumen composition advantageously comprises from about 90 wt. % to about 99.5 wt. % virgin Bitumen and from about 0.5 wt. % to about 10 wt. % polymerized CNSL according to the invention. If the bitumen in the composition is natural bitumen, the bitumen composition advantageously comprises from about 65 wt. % to about 90 wt. % natural bitumen and from about 10 wt. % to about 35 wt. % polymerized CNSL according to the invention. Moreover, the present invention relates to the use of a modified bitumen according to the invention in roofing applications. Also, the present invention relates to the use of a modified bitumen according to the invention in bank revetment applications.

The modified bitumen composition according to the present invention is improved on properties important for its usefulness in asphalt compositions, such as colloidal index (CII), penetration index (PI), stiffness, fatigue, phase angle and/or water sensitivity (ITSR).

A modified bitumen composition has been improved with respect to a property, if the measured value of the property in question is getting closer to the ideal value or ideal value range for said property or if the measured value is brought within the ideal range for said property by the addition of a polymerized CNSL according to the invention, when compared to a corresponding bitumen composition to which no CNSL was added and/or to a bitumen composition which has been modified by addition of R-CNSL, T-CNSL and/or DR-CNSL. The ideal value range for colloidal index (CII) is from 0.2 to 0.4 when determined in accordance with formula 4 as described above. The ideal value range for penetration index (PI) is from −1.2 to +1 when determined in accordance the penetration/ring and ball softening point method as described above. The ideal value range for stiffness is from 3500 MPa to 14,000 MPa, when determined with the so called four point (beam) bending test in accordance with NEN-EN12697-26 as described above. The ideal value for phase angle is from 20° to 25°, when measured in accordance with NEN-EN 12697-26 as described above. The ideal value range for water sensitivity (ITSR) is from 90% to 100%, when determined in accordance with NEN-EN12697-12. With respect to fatigue, a modified bitumen composition has been improved if the measured value is higher than the corresponding value for a bitumen composition to which no CNSL was added and/or for a bitumen composition which has been modified by addition of R-CNSL, T-CNSL and/or DR-CNSL, where fatigue is determined according to the four point bending test NEN-EN12697-24 as described above.

In one embodiment, the modified bitumen composition according to the present invention is improved with respect to at least one of the properties selected from the group consisting of colloidal index (CII), penetration index (PI), stiffness, fatigue, phase angle and water sensitivity (ITSR), compared to a corresponding bitumen composition to which no CNSL was added. In a preferred embodiment of the invention, the modified bitumen composition is improved with respect to at least two, such as at least three, at least four or at least five of the properties selected from the group consisting of colloidal index (CII), penetration index (PI), stiffness, fatigue, phase angle and water sensitivity (ITSR), compared to a corresponding bitumen composition to which no CNSL was added. In a more preferred embodiment, the modified bitumen composition according to the invention is improved with respect to colloidal index (CII), penetration index (PI), stiffness, fatigue, phase angle and water sensitivity (ITSR), compared to a corresponding bitumen composition to which no CNSL has been added.

In another preferred embodiment, the modified bitumen composition according to the invention has:
  a lower colloidal index (CII) than the corresponding bitumen composition to which no CNSL has been added,
  a lower penetration index (PI) than the corresponding bitumen composition to which no CNSL has been added,
  a lower stiffness than the corresponding bitumen composition to which no CNSL has been added,
  a higher fatigue than the corresponding bitumen composition to which no CNSL has been added,
  a higher phase angle than the corresponding bitumen composition to which no CNSL has been added, and/or
  a higher water sensitivity (ITSR) than the corresponding bitumen composition to which no CNSL has been added.

In another embodiment, the modified bitumen composition according to the present invention is improved with respect to at least one of the properties selected from the group consisting of colloidal index (CII), penetration index (PI), stiffness, fatigue, phase angle and water sensitivity (ITSR), compared to a corresponding bitumen composition which has been modified by addition of R-CNSL, T-CNSL and/or DR-CNSL. In a preferred embodiment of the invention, the modified bitumen composition is improved with respect to at least two, such as at least three, at least four or at least five of the properties selected from the group consisting of colloidal index (CII), penetration index (PI), stiffness, fatigue, phase angle and water sensitivity (ITSR), compared to a corresponding bitumen composition which has been modified by addition of R-CNSL, T-CNSL and/or DR-CNSL. In a more preferred embodiment, the modified bitumen composition according to the invention is improved with respect to colloidal index (CII), penetration index (PI), stiffness, fatigue, phase angle and water sensitivity (ITSR), compared to a corresponding bitumen composition which has been modified by addition of R-CNSL, T-CNSL and/or DR-CNSL.

In another preferred embodiment, the modified bitumen composition according to the invention has:
- a lower colloidal index (CII) than the corresponding to a bitumen composition which has been modified by addition of R-CNSL, T-CNSL and/or DR-CNSL,
- a lower penetration index (PI) than the corresponding bitumen composition which has been modified by addition of R-CNSL, T-CNSL and/or DR-CNSL,
- a lower stiffness than the corresponding bitumen composition which has been modified by addition of R-CNSL, T-CNSL and/or DR-CNSL,
- a higher fatigue than the corresponding bitumen composition which has been modified by addition of R-CNSL, T-CNSL and/or DR-CNSL,
- a higher phase angle than the corresponding bitumen composition which has been modified by addition of R-CNSL, T-CNSL and/or DR-CNSL, and/or
- a higher water sensitivity (ITSR) than the corresponding bitumen composition which has been modified by addition of R-CNSL, T-CNSL and/or DR-CNSL.

In another embodiment, the modified bitumen composition according to the present invention is improved with respect to at least one of the properties selected from the group consisting of colloidal index (CII), penetration index (PI), stiffness, fatigue, phase angle and water sensitivity (ITSR), compared to a corresponding bitumen composition which has been modified by addition of a corresponding amount of R-CNSL, T-CNSL and/or DR-CNSL. In a preferred embodiment of the invention, the modified bitumen composition is improved with respect to at least two, such as at least three, at least four or at least five of the properties selected from the group consisting of colloidal index (CII), penetration index (PI), stiffness, fatigue, phase angle and water sensitivity (ITSR), compared to a corresponding bitumen composition which has been modified by addition of a corresponding amount of R-CNSL, T-CNSL and/or DR-CNSL. In a more preferred embodiment, the modified bitumen composition according to the invention is improved with respect to colloidal index (CII), penetration index (PI), stiffness, fatigue, phase angle and water sensitivity (ITSR), compared to a corresponding bitumen composition which has been modified by addition of a corresponding amount of R-CNSL, T-CNSL and/or DR-CNSL.

In another preferred embodiment, the modified bitumen composition according to the invention has:
- a lower colloidal index (CII) than the corresponding to a bitumen composition which has been modified by addition of a corresponding amount of R-CNSL, T-CNSL and/or DR-CNSL,
- a lower penetration index (PI) than the corresponding bitumen composition which has been modified by addition of a corresponding amount of R-CNSL, T-CNSL and/or DR-CNSL,
- a lower stiffness than the corresponding bitumen composition which has been modified by addition of a corresponding amount of R-CNSL, T-CNSL and/or DR-CNSL,
- a higher fatigue than the corresponding bitumen composition which has been modified by addition of a corresponding amount of R-CNSL, T-CNSL and/or DR-CNSL,
- a higher phase angle than the corresponding bitumen composition which has been modified by addition of a corresponding amount of R-CNSL, T-CNSL and/or DR-CNSL, and/or
- a higher water sensitivity (ITSR) than the corresponding bitumen composition which has been modified by addition of a corresponding amount of R-CNSL, T-CNSL and/or DR-CNSL.

Moreover, the present invention relates to the use of a bitumen as modified in accordance with the present process in roofing applications. Also, the present invention relates to the use of a bitumen as modified in accordance with the present process in bank revetment applications.

Asphalt Compositions Comprising Modified Bitumen According to the Invention.

The present invention also relates to an asphalt mixture comprising a modified bitumen composition according to the invention. As used herein, the term "asphalt" can either mean the bitumen itself or a mixture of mineral aggregate and a bituminous binder.

The invention will now be further illustrated by the following Examples, which do not limit the invention in any way.

EXAMPLES

Example 1—Comparative Study of Different CNSL Samples 6 different CNSL samples were characterized for their physico-chemical properties and analyzed by gel permeation chromatography (GPC) with respect to retention time, $M_n$, $M_w$, $M_w$:$M_n$, and area in percentage under the curve of peak 1 and 2, respectively, (Area %). The first peak is the polymerized fraction of varying $M_w$ and the second peak is the un-polymerized fraction, which mainly consists of cardanol and has an $M_w$ in the area of 350-370 g/mol. Sample 1 is a DR-CNSL from Cardolite with product code NX-5345 produced in China (GPC chromatogram shown as FIG. 2A). Sample 2 is a DR-CNSL from Cardolite with product code NX-5345 produced in USA (GPC chromatogram shown as FIG. 2B). Samples 3 and 4 are two different samples of T-CNSL (NC-603) (GPC chromatogram shown as FIGS. 1A and 1B). Sample 5 is a DP-CNSL composition obtained by subjecting sample 3 to a heat treatment at a temperature between 250° C. and 300° C. for 6 hours, under reflux and at atmospheric pressure to obtain a polymerized CNSL according to the present invention (GPC chromatogram shown as FIG. 3A). Sample 6 is a CNSL composition obtained by subjecting a DR-CNSL (sample 1) to a heat treatment at 200° C. for 2 hours, under reflux and at atmospheric pressure (GPC chromatogram shown as FIG. 3B).

GPC characterization of CNSL samples 1-6 was carried out with an isocratic elution using the following conditions:

Flow rate: 1 ml/min; Mobile phase: THF (isocratic mode); Detector: refractive index; Columns: TSKgel3000, TSKgel2000, TSKgel1000; Injection volume: 20 µl; Sample concentration: 10 mg/ml; Analysis temperature: 40° C.;

Calibration type: 12 narrow MW polystyrene standards. The GPC data for CNSL samples 1-6 is shown in table 1, from which it is clear that the DP-CNSL according to the invention differs from the known CNSLs with respect to Mw, Mn, Mw:Mn and the amount of polymerized fraction. Furthermore, it is clear from the difference between sample 1 and sample 6, that the DR-CNSL still undergoes further polymerization, when subjected to the method of the present invention.

TABLE 1

| Composition | Sample No. | Peak No. | Ret. Time (min) | $M_n$ | $M_w$ | $M_w/M_n$ | Area % |
|---|---|---|---|---|---|---|---|
| DR-CNSL | 1 | 1 | 16,222 | 937 | 2123 | 2.26 | 46.8 |
|  |  | 2 | 17,736 | 343 | 348 | 1.01 | 53.2 |
|  |  | Total |  | 464 | 1166 | 2.51 | 100 |
| DR-CN5L | 2 | 1 | 15,073 | 927 | 2152 | 2.32 | 66.3 |
|  |  | 2 | 15,515 | 362 | 365 | 1.01 | 33.7 |
|  |  | Total |  | 606 | 1533 | 2.53 | 100 |
| T-CNSL | 3 | 1 | 15,971 | 684 | 731 | 1.07 | 6.5 |
|  |  | 2 | 17,502 | 360 | 365 | 1.01 | 93.5 |
|  |  | Total |  | 379 | 392 | 1.03 | 100 |
| T-CNSL | 4 | 1 | 16,045 | 870 | 2602 | 2.99 | 31.9 |
|  |  | 2 | 17,528 | 357 | 362 | 1.01 | 68.8 |
|  |  | Total |  | 434 | 438 | 1.01 | 100 |
| DP-CNSL | 5 | 1 | 15,536 | 1148 | 4552 | 3.97 | 74.2 |
|  |  | 2 | 17,567 | 354 | 356 | 1 | 25.8 |
|  |  | Total |  | 695 | 3415 | 4.91 | 100 |
| DR-DP-CNSL | 6 | 1 | 15,993 | 1131 | 4541 | 4.02 | 65 |
|  |  | 2 | 17,412 | 365 | 369 | 1.01 | 35 |
|  |  | Total |  | 650 | 3044 | 4.68 | 100 |

All of the CNSL samples 1-6 were dark brown liquids. Water content was determined in accordance with ASTM D 4276 and viscosity was determined in accordance with ASTM D2196 at 25° C. The results are shown in Table 2. From table 2 it is clear that DP-CNSL according to the invention differs from the known CNSLs with respect to water content and viscosity. Furthermore, it is clear from the difference between sample 1 and sample 6, that DR-CNSL changes, when subjected to the method of the present invention and accordingly, that DP-CNSL according to the present invention is a different composition than DR-CNSL.

TABLE 2

| Composition | Sample No. | Water content [wt. %] | Viscosity [mPa · s at 25° C.] |
|---|---|---|---|
| DR-CNSL | 1 | 0.59 | 2027 (25° C., TR10, 100 rpm, 20.4%) |
| DR-CNSL | 2 | 0.16 | 466 (25° C., TR8, 100 rpm, 93.3%) |
| T-CNSL | 3 | 0.32 | 150 (25° C., TR8, 100 rpm, 30.1%) |
| T-CNSL | 4 | 0.58 | 406 (25° C., TR8, 100 rpm, 81.2%) |
| DP-CNSL | 5 | 0.12 | 69870 (25° C., TR11, 12 rpm, 83.8%) |
| DP-CNSL | 6 | 0.16 | 29852 (25° C., TR11, 30 rpm, 89.6%) |

Example 2—Modification of Aged Blown Bitumen

A number of bitumen compositions were made from an aged (blown) bitumen composition having the properties as shown in Table 3. The penetration index (PI) and the colloidal index (CII) as defined hereinbefore were determined in respect of this modified bitumen composition and their values are shown in Table 3.

Bitumen compositions II-V were prepared by adding different amounts of raw CNSL subjected to a light heat treatment as controls. Bitumen compositions VII-X were prepared by adding corresponding different amounts of the polymerized CNSL according to the invention. Compositions I and VI are both controls with no added CNSL.

For bitumen compositions I-V, the cashew nut shell liquid was obtained by heating a raw cashew nut shell liquid at a temperature of 140° C. for 60 minutes. The alkyl-phenol polymers present in the cashew nut shell liquid had a $M_n$ of 379 g/mol and a $M_w$ of 392 g/mol; the alkyl-phenol polymers were present in an amount of 65 wt. %, based on total weight of the cashew nut shell liquid; and 99 wt. % of the anarcadic acid originally present in the crude cashew nut shell liquid was converted into cardanol.

Bitumen composition I was prepared as follows: 500 grams of the aged blown bitumen with no added CNSL.

Bitumen composition II was prepared as follows: 475 grams of the aged blown bitumen composition was mixed with 25 grams of the CNSL obtained in this example.

Bitumen composition III was prepared as follows: 450 grams of the aged blown bitumen composition was mixed with 50 grams of the CNSL obtained in this example.

Bitumen composition IV was prepared as follows: 425 grams of the aged blown bitumen composition was mixed with 75 grams of the CNSL obtained in this example.

Bitumen composition V was prepared as follows: 400 grams of the aged blown bitumen composition was mixed 100 grams of the cashew nut shell liquid as used in Example 2.

For bitumen compositions VII-X, the polymerized cashew nut shell liquid was obtained by heating a raw cashew nut shell liquid at a temperature of 250° C. for 120 minutes, under reflux and at atmospheric pressure to obtain a polymerized CNSL according to the invention. This polymerized CNSL had a $M_n$ of 695 g/mol and an $M_w$ of 3415 g/mol. The alkyl-phenol polymers were present in an amount of 95 wt %, based on total weight of the cashew nut shell liquid; and 99% of the anarcadic acid originally present in the crude cashew nut shell liquid was converted into cardanol.

Bitumen composition VII was prepared by mixing 475 grams of the aged blown bitumen composition with 25 grams of the polymerized CNSL according to the invention.

Bitumen composition VIII was prepared as follows: 450 grams of the aged blown bitumen composition was mixed with 50 grams of a polymerized CNSL according to the invention.

Bitumen composition IX was prepared by mixing 425 grams of the aged blown bitumen composition with 75 grams of the polymerized CNSL according to the invention.

Bitumen composition X was prepared by mixing 400 grams of the aged blown bitumen composition with 100 grams of the polymerized CNSL according to the invention.

The penetration index (PI) and the colloidal index (CII) as defined hereinbefore were determined in respect of this modified bitumen compositions I to X and their values are shown in Table 3. From Table 4 it will be clear that the bitumen compositions modified in accordance with the present invention (bitumen compositions VII-X) display a desirable lower CII and display a considerably improved performance in terms of penetration index when compared with the comparative bitumen compositions I-VI. The Penetration Index (PI) is a measure of the temperature dependence of the viscosity of bitumen and should be between the −2.0 and 2.0 and preferably between the −1.5 and 0.7.

TABLE 3

| Composition | Blown Bitumen |
|---|---|
| Saturates | 0 |
| Aromatics | 15 |
| Resins | 48 |
| Asphaltenes | 37 |
| Total | 100 |
| T(R&B) | 102 |
| Pen 25 | 5 |
| Pen 40 | 11 |
| Sample No. | II |
| PI value | 2.3 |
| CII value | 0.6 | etration index (see table 5). For comparison, the high quality bitumen, "Puerto José quality" is included.

Indirect Tensile Strength Retained (ITSR) was determined according to NEN-EN12697-12. The shown ratio is the calculated average of two time three samples tested.

The asphalt stiffness is determined with the so called four point (beam) bending test. This test is according to European norm NEN-EN12697-26. This test is performed at a temperature of 20° C. and a load frequency of 8 Hz. The frequency sweep is run at 0.1 Hz, 0.2 Hz, 0.5 Hz, 1 Hz, 2 Hz, 5 Hz, 8 Hz, 10 Hz, 20 Hz, 30 Hz and 0.1 Hz. The results shown are the calculated average of eighteen tested samples.

The fatigue properties of the 100% recycled asphalt is specified according the four point bending test NEN-EN12697-24. The test is run at a temperature of 20° C. and a frequency of 30 Hz. The shown values are based on eighteen samples were at least six samples were tested on three different strain levels.

The phase angle is a measurement which is an indication of the ability to withstand a certain load without failing an to recover after the load is ended ("flexibility") the phase angle is determined at 20° C. at the mean stiffness with 8 Hz.

TABLE 4

PI in blown bitumen

| | | Technical CNSL | | | | | Directly polymerized CNSL according to the invention | | | | |
|---|---|---|---|---|---|---|---|---|---|---|---|
| Wt. % CNSL | Sample No. | T (R&B) | Pen 25 | Pen40 | CII | PI | Sample No. | T (R&B) | Pen 25 | Pen40 | CII | PI |
| 0 | I | 102 | 5 | 11 | 0.6 | 2.3 | VI | 102 | 5 | 11 | 0.6 | 2.3 |
| 5 | II | 72 | 11 | 30 | 0.7 | 0.1 | VII | 78 | 8 | 16 | 0.6 | 0.4 |
| 10 | III | 52 | 25 | 82 | 0.7 | −2.1 | VIII | 64 | 15 | 34 | 0.5 | −0.7 |
| 15 | IV | 33 | 69 | 162 | 0.8 | −6.1 | IX | 55 | 28 | 65 | 0.5 | −1.3 |
| 20 | V | 18 | 154 | 250 | 0.9 | −17.4 | X | 50 | 55 | 105 | 0.2 | −1.0 |

Example 3—Modification of Virgin Bitumen

In order to compare the polymerized CNSL according to the present invention with the known CNSL compositions (raw, technical and distillation residue CNSLs) in terms of their modifying effect on virgin bitumen, 5 or 10 wt. % of the respective CNSL compositions were added to a low quality virgin bitumen (Mexican crude 70/100). The polymerized CNSL according to the invention was prepared by boiling 1000 grams of T-CNSL in the presense of porous silica at atmospheric pressure in glass reflux setup. The boiling took place for approximately five hours. After cooling down, the yield, viscosity and $M_w$ were determined (see sample 5 in tables 1 and 2). Bitumen compositions comprising 5 wt. % of the polymerized CNSL according to the invention were analyzed with respect to stiffness, fatigue, phase angle, water sensitivity, colloidal index and penetration index and the bitumen compositions comprising 10 wt. % were analyzed with respect to colloidal index and pen- The effect on stiffness, fatigue, phase angle, water sensitivity, colloidal index and penetration index is shown in Table 5. All the bitumen which have a CII of above 0.6 and/or a PI above 2 or below the −2 are not ideal. The virgin bitumen base on the Mexican crude is not suitable for road building because on top of unfavorable CII and the PI, we see a low phase angle of 6° in combination with a high stiffness: This type asphalt will crack if the loading is a little too high. With the DR-CNSL we see an improvement but still the phase angle is too small, which in combination with a high stiffness makes it brittle. The samples with the R-CNSL and the T-CNSL do not make bitumen better but even worse as the bitumen look more unstable (CII 0.7) and the phase angle is very low (even 2°). It is clear that the sample to which polymerized CNSL according to the invention was added, comes closest to the high quality bitumen, "Puerto José".

TABLE 5

Asphalt Properties with Straight run Bitumen
Mexican Based Crude with 5% CNSL Addition

| Composition | Sample No. | Stiffness [Mpa] | Fatigue [μm/m] | Phase angle [°] | Water sensitivity (ITSR) [%] | Mexican Crude + 5% CNSL | | Mexican Crude + 10% CNSL | | Overall Results |
|---|---|---|---|---|---|---|---|---|---|---|
| | | | | | | PI | CII | PI | CII | |
| Raw CNSL | | 33,062 | 86 | 2 | 65 | −1.8 | 0.7 | −5.5 | 0.7 | Fail |
| Technical CNSL | 4 | 28,890 | 94 | 4 | 74 | −1.7 | 0.7 | −5.1 | 0.7 | Fail |

TABLE 5-continued

Asphalt Properties with Straight run Bitumen
Mexican Based Crude with 5% CNSL Addition

| Composition | Sample No. | Stiffness [Mpa] | Fatique [μm/m] | Phase angle [°] | Water sensitivity (ITSR) [%] | Mexican Crude + 5% CNSL | | Mexican Crude + 10% CNSL | | Overall Results |
|---|---|---|---|---|---|---|---|---|---|---|
| | | | | | | PI | CII | PI | CII | |
| Distillation residue CNSL | 1 | 23,865 | 101 | 7 | 90 | −2 | 0.6 | −2.1 | 0.6 | Pass |
| Directly polymerized CNSL | 5 | 15,647 | 155 | 12 | 101 | −0.9 | 0.6 | −1.5 | 0.5 | Pass+ |
| | | | | | Reference Virgin Bitumen 100% | | | | | |
| Virgin bitumen (Mexican Crude) 70/100 | Unstable Bitumen | 24,617 | 114 | 6 | 99 | −0.7 | 0.6 | −0.7 | 0.6 | Pass− |
| Virgin bitumen (Puerto José) 70/100 | Stable Bitumen | 10,109 | 143 | 23 | 96 | 0.1 | 0.4 | 0.1 | 0.1 | Pass++ |

Example 4—Modification of Mixability in Reclaimed Asphalt Pavement

The test was performed in 2.5 MT asphalt batch mixer. To determine the influence of the DP-CNSL a Base Asphalt was used to compare the flow properties of the asphalt mix in an asphalt production plant. For this experiment a 2500 kg asphalt batch mixer was used. The fluidity (viscosity of the mix) has a direct correlation with the energy consumption of the mixer. When RAP (Recycled Asphalt Pavement) is introduced in mix, the energy consumption is increased because of the stiff properties of the RAP. By adding the DP-CNSL a strong decrease of energy consumption is observed. Table 6 shows the electrical mixing power consumption per ton asfalt with and without the DP-CNSL next to the virgin asphalt mix.

TABLE 6

Asphalt Type: Base 16/22

| | "DP" CNSL | Kwh/MT mixer |
|---|---|---|
| Virgin | 0% | 2.14 |
| 25% RAP | 0% | 2.26 |
| 50% RAP | 0% | 2.67 |
| 70% RAP | 0% | 2.81 |
| 100% RAP | 5% | 0.97 |
| 100% RAP | 8% | 0.82 |

Advantageous Embodiments are set out in the following clauses:
1. A process for modifying a bitumen composition which comprises the steps of:
(a) providing a bitumen composition; and
(b) mixing the bitumen composition with a cashew nut shell liquid which comprises alkyl-phenol polymers having a molecular weight ($M_w$) in the range of from 500-25,000 to form a modified bitumen composition.
2. A process according to embodiment 1, wherein the alkyl-phenol polymers have a molecular weight ($M_w$) in the range of from 600-10,000.
3. A process according to embodiments 1 or 2, wherein the alkyl-phenol polymers have a number average molecular weight ($M_n$) in the range of from 400-2500.
4. A process according to any one of embodiments 1-3, wherein in step (b) the cashew nut shell liquid is present in an amount in the range of from 0.5-35 wt %, based on total weight of the bitumen composition.
5. A process according to any one of embodiments 1-4, wherein in step (b) the alkyl-phenol polymers are present in an amount in the range of from 50-90 wt %, based on total weight of the cashew nut shell liquid.
6. A process according to any one of embodiments 1-5, wherein the bitumen composition is selected from the group consisting of blown bitumen compositions, polymer-containing bitumen compositions, metallocene-containing bitumen compositions and synthetic wax-containing bitumen compositions.
7. A process according to any one of embodiments 1-6, wherein the bitumen composition is a recycled bitumen composition.
8. A process according to any one of embodiments 1-7, wherein the cashew nut shell liquid is obtained by subjecting a crude cashew nut shell liquid to a heat treatment which is carried out at a temperature in the range of from between 250-300° C.
9. A process according to embodiment 8 which is carried out in the presence of a catalyst.
10. A bitumen composition obtainable by a process according to any one of embodiments 1-9.
11. An asphalt mixture comprising the bitumen composition according to embodiment 10 and aggregate.
12. Use of a polymerized cashew nut shell liquid as defined in any one of embodiments 1-9 to modify a bitumen composition.
13. Use of a bitumen composition as modified according to the process of any one of embodiments 1-9 in an asphalt mixture for road applications.
14. Use of a bitumen composition as modified according to the process of any one of embodiments 1-9 in roofing applications.

What is claimed is:
1. A method for the preparation of a directly polymerized cashew nut shell liquid (CNSL) composition comprising a polymerized fraction and an unpolymerized fraction, wherein the method comprises subjecting a raw or technical CNSL to a heat treatment under reflux to obtain the directly polymerized CNSL composition, wherein the heat treatment is performed until the directly polymerized CNSL composition has a molecular weight Mw of about 2800 to about 3700 g/mol.

2. The method according to claim 1, wherein the heat treatment is performed at a temperature in the range of from about 150° C. to about 400° C.

3. The method according to claim 2, wherein the heat treatment is performed for about 1 to about 10 hours.

4. The method according to claim 1, wherein the heat treatment is performed until the directly polymerized CNSL composition has a viscosity of at least 25,000 mPa·s at 25° C.

5. The method according to claim 1, wherein the heat treatment is performed until the directly polymerized CNSL composition has a number average molar mass Mn of from about 600 to about 800 g/mol.

6. The method according to claim 5, wherein the heat treatment is performed until the directly polymerized CNSL composition has a ratio Mw:Mn of from about 3.5 to about 5.5.

7. The method according to claim 1, wherein the heat treatment is performed until the polymerized fraction of the directly polymerized CNSL composition has a molecular weight Mw of from about 3800 to about 4800 g/mol.

8. The method according to claim 7, wherein the heat treatment is performed until the polymerized fraction of the directly polymerized CNSL composition has a number average molar mass Mn of from about 950 to about 1300 g/mol.

9. The method according to claim 8, wherein the heat treatment is performed until the polymerized fraction of the directly polymerized CNSL composition has a ratio of Mw:Mn of from about 2.5 to about 5.5.

\* \* \* \* \*